(12) United States Patent
Koren et al.

(10) Patent No.: US 9,077,407 B2
(45) Date of Patent: Jul. 7, 2015

(54) GEOMETRICAL CLOSED LOOP LINE OF SIGHT (LOS) MULTIPLE-INPUT-MULTIPLE-OUTPUT (MIMO)

(71) Applicants: Shay Koren, Tel Aviv (IL); Yoav Eisenberg, Hod Hasharon (IL); Eitan Tsur, Rishon Lezion (IL)

(72) Inventors: Shay Koren, Tel Aviv (IL); Yoav Eisenberg, Hod Hasharon (IL); Eitan Tsur, Rishon Lezion (IL)

(73) Assignee: Broadcom Corporation, Irvine, CA (US)

( * ) Notice: Subject to any disclaimer, the term of this patent is extended or adjusted under 35 U.S.C. 154(b) by 140 days.

(21) Appl. No.: 13/730,255

(22) Filed: Dec. 28, 2012

(65) Prior Publication Data
US 2013/0309976 A1 Nov. 21, 2013

Related U.S. Application Data

(60) Provisional application No. 61/647,380, filed on May 15, 2012.

(51) Int. Cl.
*H04B 7/02* (2006.01)
*H04B 7/04* (2006.01)
*H04B 7/08* (2006.01)

(52) U.S. Cl.
CPC ............ *H04B 7/0473* (2013.01); *H04B 7/0854* (2013.01)

(58) Field of Classification Search
USPC .............. 455/63.1, 63.4, 67.11, 562.1, 575.7, 455/101, 132, 226.1, 272, 278.1; 375/267
See application file for complete search history.

(56) References Cited

U.S. PATENT DOCUMENTS 8,571,125 B2 * 10/2013 Maru .............................. 375/267
2009/0296846 A1 * 12/2009 Maru .............................. 375/267

FOREIGN PATENT DOCUMENTS

EP 2180623 A1 4/2010

OTHER PUBLICATIONS

Lebrun, et al; MIMO transmission over a time-varying channel using SVD; IEEE Transactions on Wireless Communications; Mar. 2005; pp. 757-764; vol. 4, Iss 2.

(Continued)

*Primary Examiner* — Blane J Jackson
(74) *Attorney, Agent, or Firm* — Garlick & Markison; Shayne X. Short

(57) ABSTRACT

Geometrical closed loop line of sight (LOS) multiple-input-multiple-output (MIMO). Singular value decomposition (SVD) processing for a LOS communication channel into respective channel matrices, and appropriate processing of signals within transmitter and/or receiver communication devices operate to support very high data throughput, including approaching or converging to the Shannon limit channel capacity (e.g., bits/sec/Hz). Certain communication systems operate with multi-antenna communication devices, and sometimes, the optimal spacing between those respective antennae cannot be achieved. Appropriate processing can recover most, if not all, of any performance degradation as may be incurred by a deviation from the perfectly optimal spacing between those respective antennae. In addition, any deleterious effects of phase noise among the antennae may be mitigated by driving the antennae using a common or singular local oscillator, or tracking the communication channel (e.g., channel estimation, tracking, etc.) and updating the respective SVD channel matrices based upon such phase noise.

20 Claims, 12 Drawing Sheets

(56) References Cited

OTHER PUBLICATIONS

Yi, et al.; MIMO transceiver design using geometric mean decomposition; IEEE Information Theory Workshop; Oct. 24-29, 2004; pp. 193-197.

Daneshrad, et al.; Phase noise suppression in MIMO OFDM systems with incoherent phase noise; IEEE Military Communications Conference; 2011 MILCOM; Nov. 7, 2011; pp. 42-44.

Alcatel-Lucent Shanghai Bell, et al.; An Over-the-Air-Calibration Scheme for ZF based SU/MU-MIMO; 3GPP TSG RAN WG1 Meeting #57bis; Jun. 29-Jul. 30 2009; pp. 1-10.

European Patent Office; European Search Report; EP Application No. 13002461.5; Sep. 4, 2013; 4 pgs.

Lebrun, et al; MIMO transmission over a time-varying channel using SVD; Global Telecommunications Conference; GLOBECOM '02; Nov. 17-21, 2002; pp. 414-418; vol. 1.

* cited by examiner

300

US 9,077,407 B2

GEOMETRICAL CLOSED LOOP LINE OF SIGHT (LOS) MULTIPLE-INPUT-MULTIPLE-OUTPUT (MIMO)

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:
1. U.S. Provisional Patent Application Ser. No. 61/647,380, entitled "Geometrical closed loop architecture for line of sight MIMO,", filed May 15, 2012.

BACKGROUND OF THE INVENTION

1. Technical Field of the Invention

The invention relates generally to communication systems; and, more particularly, it relates to wireless communications effectuated using multiple antennae.

2. Description of Related Art

Data communication systems have been under continual development for many years. Communication systems may include any of a variety of types of communication links therein. With respect to certain wireless communication links, they may be implemented such that at least one of a transmitter and a receiver wireless communication device (or transceiver wireless communication device) includes more than one antenna for transmitting and receiving signals. In such instances, an appropriately designed spacing between the respective antennae can help ensure a more optimal performance. However, there may be some situations in which this exact spacing between respective antennae may not be achieved. For example, there may be instances in which the optimal spacing between respective antennae may be larger than the practical spacing that may be made in a given installation. When deviation from the optimal spacing between antennae becomes significant (e.g., greater than 25%), the throughput which may be supported by the communication system may suffer and degrade significantly. Within such communication systems, including those having at least one wireless, line of sight (LOS) communication channel, the present art does not provide an acceptable solution to maintain, ensure, or increase the amount of data throughput therein.

DETAILED DESCRIPTION OF THE INVENTION

Figure 1:
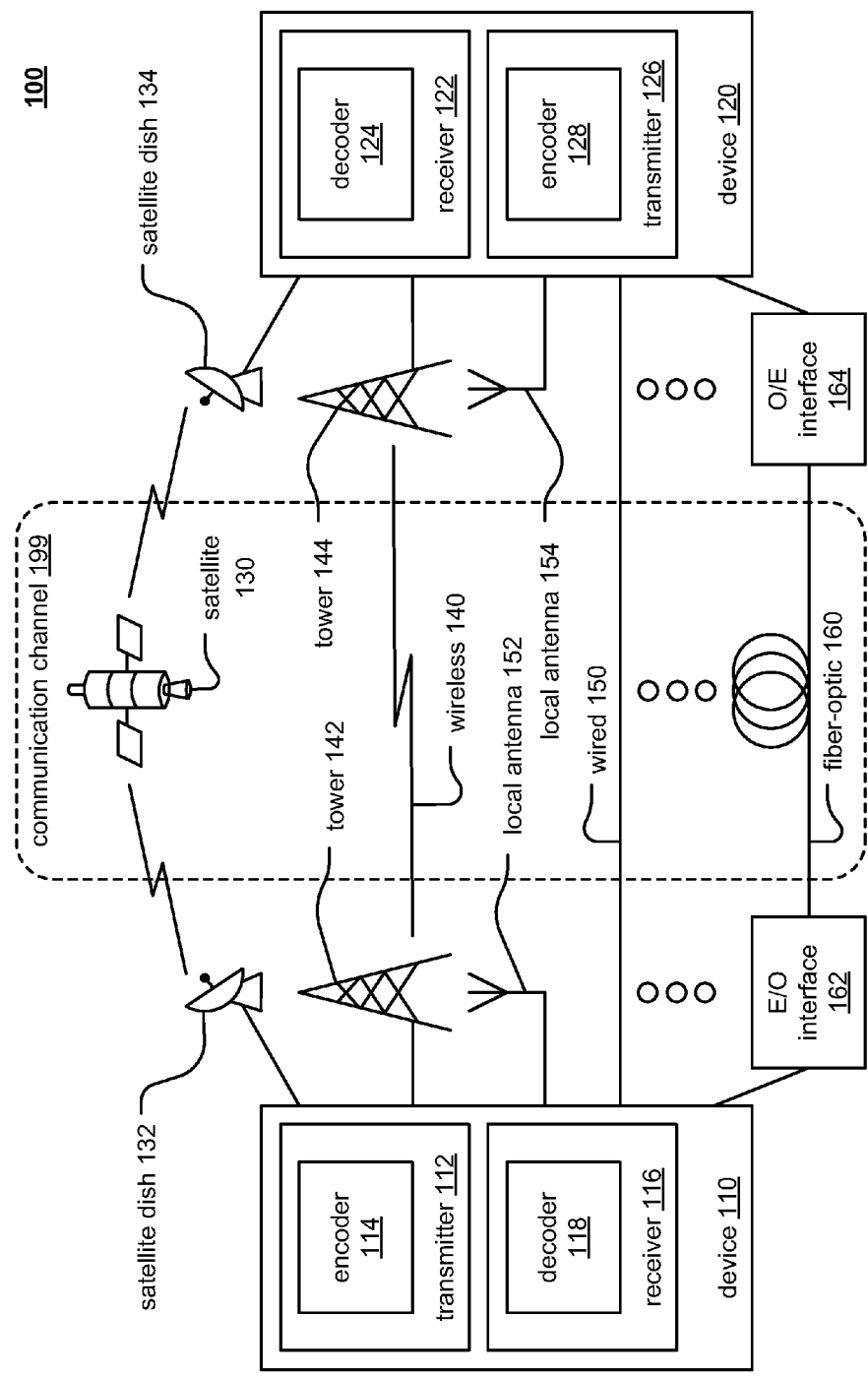
FIG. 1 and FIG. 2 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
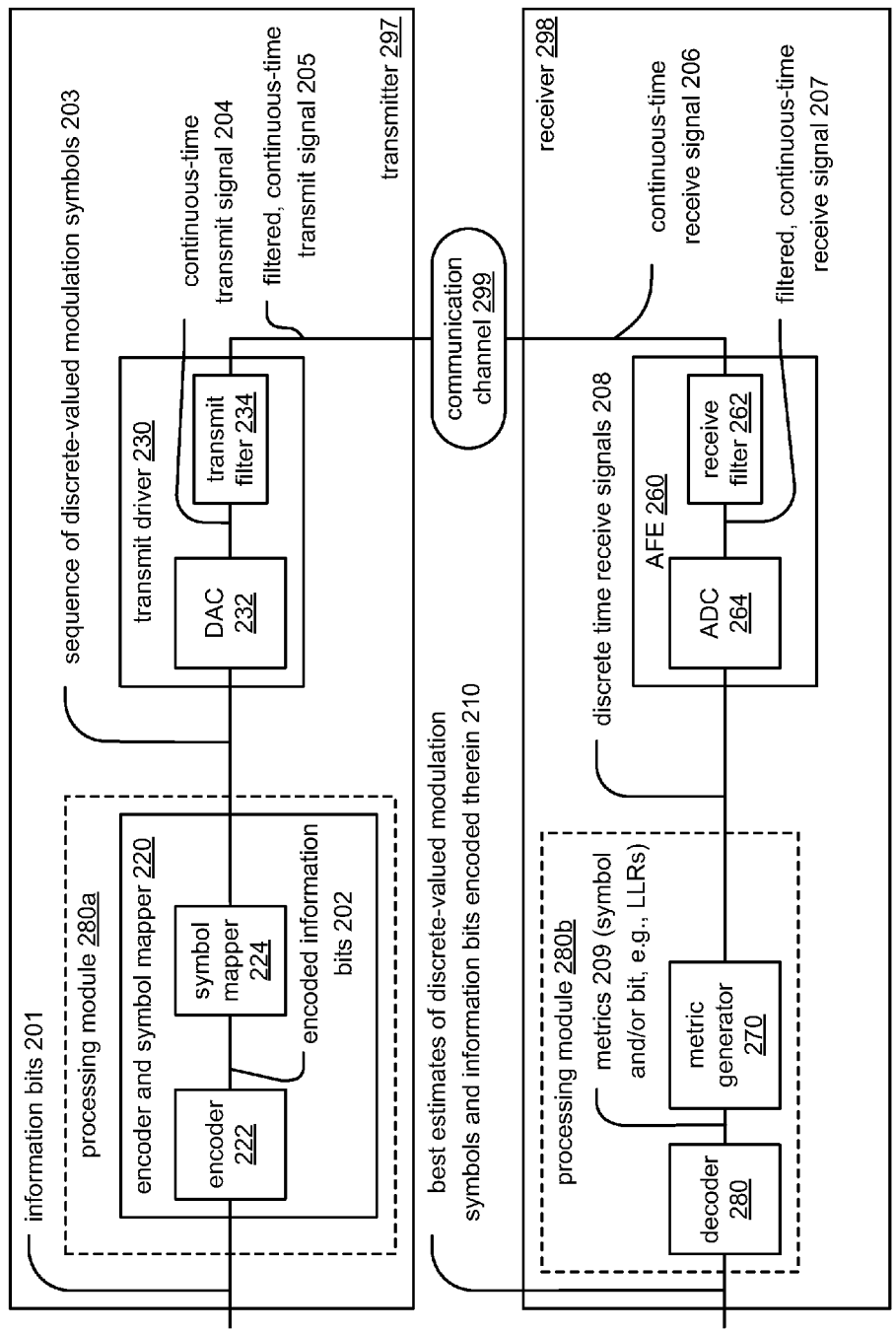

FIG. 1 and FIG. 2 illustrate various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. therein may be implemented. For example, this diagram shows a processing module 280a as including the encoder and symbol mapper 220 and all associated, corresponding components therein, and a processing module 280b is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Generally speaking, any of a number of different types of communication systems, including those described with reference to FIG. 1, may employ various aspects, embodiments, and/or their equivalents, of the invention. Certain communication systems may include communication links of varying types (e.g., wireless, wired, optical, etc.). Any such communication system that includes at least one wireless communication link therein can operate in accordance with any one or more of the various aspects, embodiments, and/or their equivalents, of the invention. Various aspects, embodiments, and/or their equivalents, of the invention may be applied to a wireless communication link that is line of sight (LOS) and in which at least one of a transmitter wireless communication device and a receiver wireless communication device includes more than one antenna for receiving and transmitting signals. Even in situations when the optimal antenna spacing may not be achieved (e.g., a given installation may not have sufficient space to provide for the precise and optimal spacing between respective antennae), such loss of performance which may occur due to a deviation from the optimal antenna spacing may be recovered in a system operating in accordance with any one or more of the various aspects, embodiments, and/or their equivalents, of the invention.

Figure 3:
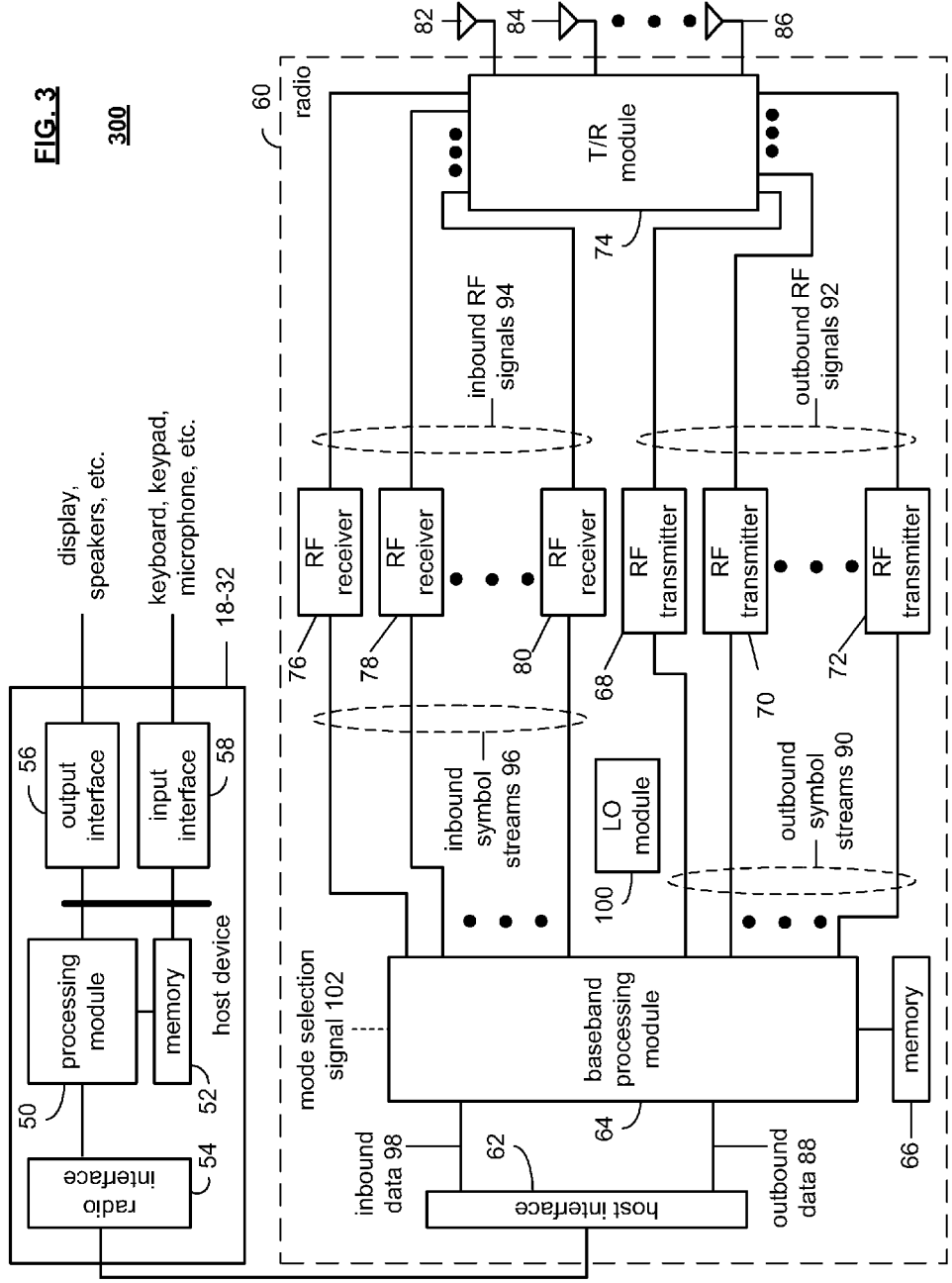
FIG. 3 is a diagram illustrating an embodiment of a wireless communication device.

FIG. 3 is a diagram illustrating an embodiment 300 of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module (LO) 100. With respect to such a LO module 100, it is noted that each respective antennae of the wireless communication device may be driven from the same LO module 100 to compensate for, minimize, and/or reduce any phase noise generated in the respective antennae of the wireless communication device.

The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90.

In some embodiments, such as certain cellular applications, the baseband processing module 64 receives the outbound data 88 and, based on a mode selection signal 102, produces one or more outbound symbol streams 90. In such an embodiment, a mode selection signal 102 will indicate a particular mode or operation (e.g., indicate a frequency band of 2.4 GHz or 5 GHz, a channel bandwidth of 20 or 22 MHz (e.g., channels of 20 or 22 MHz width)) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. In some embodiments, a code rate may be supplied as well as number of coded bits per subcarrier (NBPSC), coded bits per OFDM symbol (NCBPS), data bits per OFDM symbol (NDBPS).

It is of course noted that other types of channels, having different bandwidths, may be employed in other embodiments without departing from the scope and spirit of the invention.

The baseband processing module 64, based on the mode selection signal 102 produces the one or more outbound symbol streams 90 from the outbound data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the outbound data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received (e.g., and, in some embodiments, a particular a mode may be select for operation). The baseband processing module 64 receives the inbound symbol streams 96 and converts them into inbound data 98, which is provided to the host device 18-32 via the host interface 62.

In one embodiment of radio 60, it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams. The plurality of direct conversion modules is operably coupled to convert the plurality of error protected data streams into a plurality of radio frequency (RF) signals.

As one of average skill in the art will appreciate, the wireless communication device of FIG. 3 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 4:
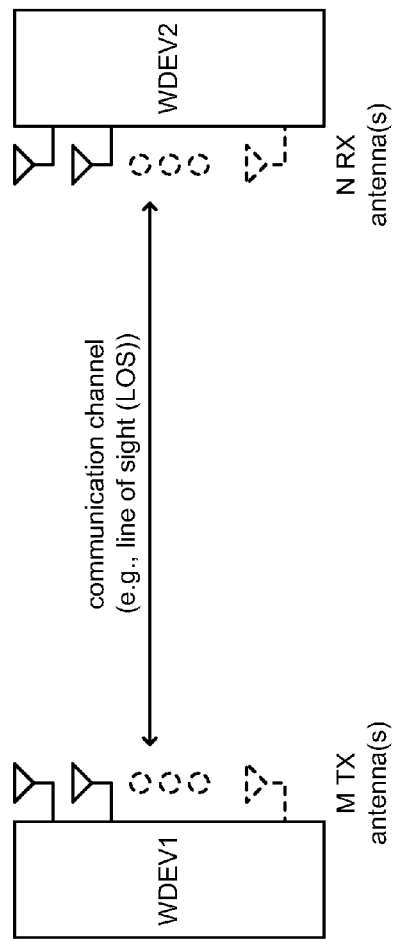
FIG. 4 illustrates an embodiment of an M×N multiple-input-multiple-output (MIMO) communication system.

FIG. 4 illustrates an embodiment 400 of an M×N multiple-input-multiple-output (MIMO) communication system. An M×N MIMO communication system may be viewed as including at least one transmitter wireless communication device having M transmitters (e.g., M antennae) and at least one receiver wireless communication device having N receivers (e.g., N antennae). The ability to separate the different M transmitted streams at the N receivers is based on the assumption that each of the transmitted streams will encounter a different path between the transmitter and all of receivers.

In some MIMO systems the different paths are generated by reflections from the environment, (e.g., ground, walls). Communication systems may be implemented using any of a variety of communication media, technologies, etc. such as with reference to FIG. 1, and if at least one such communication link therein is a wireless line of sight (LOS) communication link (e.g., in a microwave communication system), separation (of the respective paths between transmitter antennae and receiver antennae) is achieved geometrically. The phase of the received signals will depend on the length of the path, thus different paths will get different phases.

Figure 5:
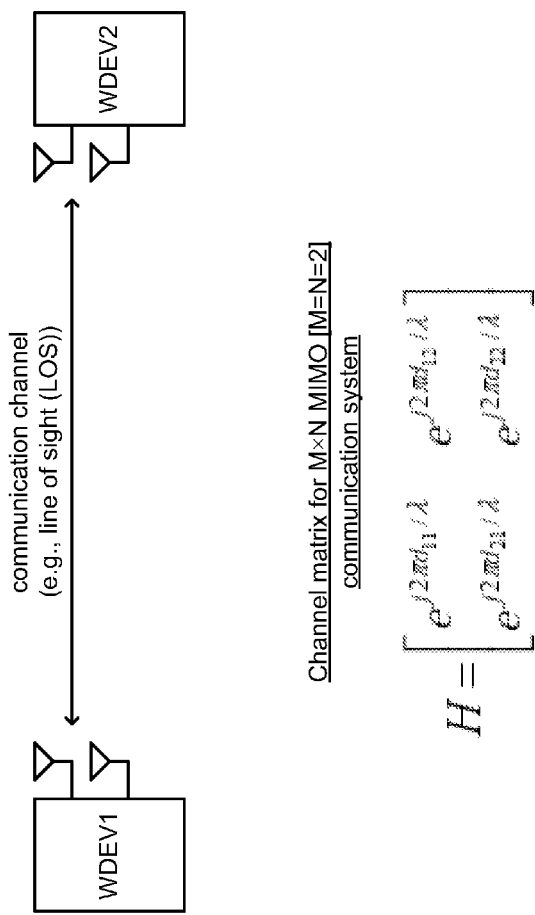
FIG. 5 illustrates an embodiment of a 2×2 MIMO communication system and the corresponding channel matrix.

FIG. 5 illustrates an embodiment 500 of a 2×2 MIMO communication system and the corresponding channel matrix. It is of course noted that any such MIMO communication system may include any desired number of transmitter antennae and any desired number of receiver antennae (and each of the transmitter and receiver wireless communication devices may have different respective numbers of antennae). Without loss of generality, when looking into a particular embodiment of two transmit antennae and two receive antennae (e.g., M=N=2), the channel matrix can be expressed as follows:

$$H = \begin{bmatrix} e^{j2\pi d_{11}/\lambda} & e^{j2\pi d_{12}/\lambda} \\ e^{j2\pi d_{21}/\lambda} & e^{j2\pi d_{22}/\lambda} \end{bmatrix}$$

Finding the optimal placement of the antennae will guarantee that the channel matrix can be inverted (e.g., will have a condition number close to 1). The condition number with respect to inversion represents the ratio of the largest singular value of H to the smallest. Large condition numbers indicate a nearly singular matrix.

Figure 6:
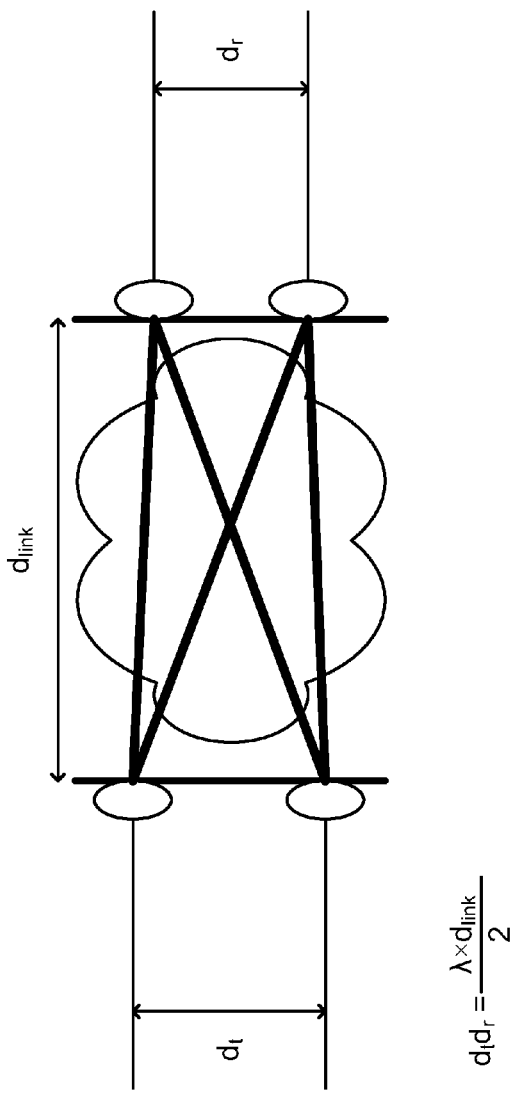
FIG. 6 illustrates an embodiment showing the optimal separation between antennae within respective transmitter and receiver wireless communication devices.

FIG. 6 illustrates an embodiment 600 showing the optimal separation between antennae within respective transmitter and receiver wireless communication devices. Having the distance between the transmitted antennae represented by $d_t$ and the distance between the received antennae represented by $d_r$, and assuming a particular embodiment that the antennae are located on the corners of a rectangular then the optimal separation can be achieved when the following identity holds:

$$d_t d_r = (\lambda \times d_{link})/2$$

Figure 7:
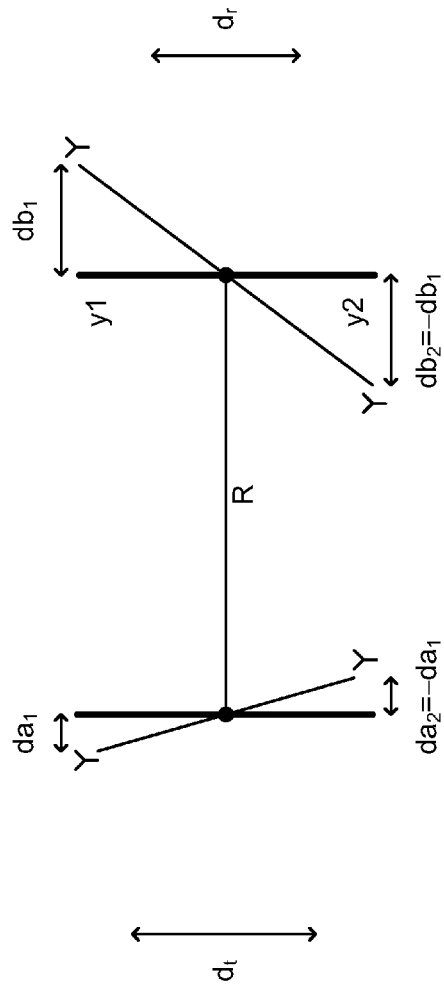
FIG. 7 illustrates an embodiment of a generalized model associated with optimal separation between antennae within respective transmitter and receiver wireless communication devices.

FIG. 7 illustrates an embodiment 700 of a generalized model associated with optimal separation between antennae within respective transmitter and receiver wireless communication devices. For example, the optimal distance depends on the carrier wave length $\lambda$, and the physical distance $d_{link}$ between the antennae. Also, it can be noted that for any given spatial setting, an optimal $d_t$ and $d_r$ values can be calculated. An example of a generalized model can is shown pictorially in FIG. 7.

Figure 8:
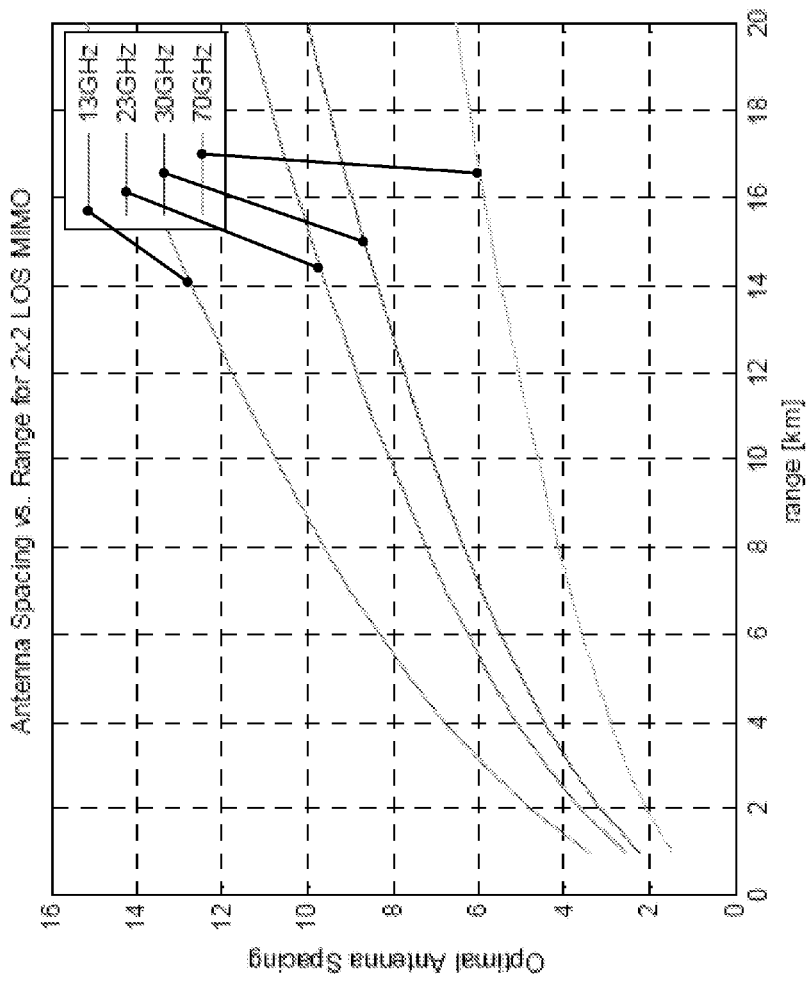
FIG. 8 illustrates an embodiment of optimal distance (in meters) for the specific case when $d_t = d_r$.

FIG. 8 illustrates an embodiment 800 of optimal distance (in meters) for the specific case when dt=dr. Generally speaking, such a novel approach may be referred to as Geometrical Open Loop MIMO approach, as there is no feedback from the receiver to the transmitter regarding the Geometrical channel transfer function.

However, in practical implementations, it is not always possible to fulfill this exact, perfect, and optimal separation of the respective antennae due to installation difficulties and limitations. When there is more than 25% deviation from optimal antenna spacing, considerable performance losses are being introduced, thus putting into question the benefit of the MIMO system.

Figure 9:
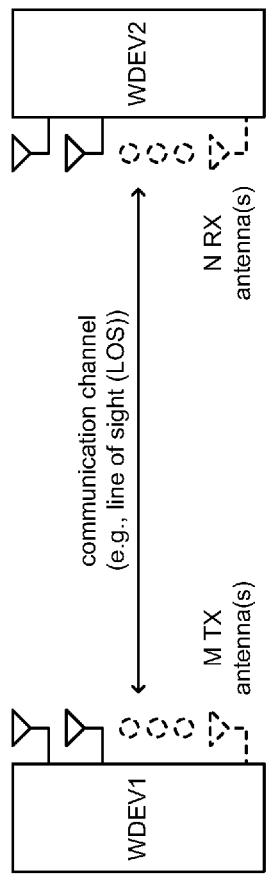
FIG. 9 illustrates an embodiment showing geometrical beamforming, respective 2 independent single-output-single-input (SISO) channels, and channel capacity of an M×N MIMO communication system.

FIG. 9 illustrates an embodiment 900 showing geometrical beamforming, respective 2 independent single-output-single-input (SISO) channels, and channel capacity of an M×N MIMO communication system.

Herein, a novel Geometrical Closed Loop MIMO approach is presented. Such a novel architecture can provide for an improvement in performance when the optimal situation of separation between the antennae cannot be achieved exactly.

For a given communication channel, H, using Singular Value Decomposition (SVD), H can be represented in the form as follows:

$$H = U \Sigma V^H (V, U [\text{unitary}], \Sigma [\text{diagonal}])$$

These respective channel matrices may be viewed as corresponding to a singular value decomposition (SVD) of the line of sight (LOS) multiple-input-multiple-output (MIMO) communication channel into respective independent streams at the transmitter communication device.

Having the transmitter being aware to the value of H (or V), then the transmitted signal can be multiplied by V in the transmitter wireless communication device and the received signal then multiplied by $U^H$ in the receiver wireless communication device (or the receiver wireless communication device can perform Zero Forcing, such as in accordance with performing zero forcing equalization (ZFE) on the signal to effectuate the increase in information carrying capacity of the signal).

For example having V in the form as shown in the diagram for geometrical beamforming in the transmitter wireless communication device, then the first antenna will transmit the sum of the transmitted original signals and second antenna will transmit the difference of the two signals. Again, such a format of a matrix may be referred as Geometrical Beam forming in the transmitter wireless communication device. These multiplications parallelize the MIMO channel into 2 independent SISO channels with gains of $\lambda 1$ and $\lambda 2$, as shown in the diagram. The value of $\eta$ corresponds to the ratio of the optimal antenna spacing ($d_{opt}$) and the actual antenna spacing (d). The capacity of the communication of the channel can be then calculated according to the equation depicted in the middle of the diagram.

At least one difference between closed loop and open loop schemes is that, in the closed loop approach, the communication channel is decomposed into independent streams at the transmitter, and in each one, the maximum number of bits that can be transmitted reliably given a power constraint are transmitted. In open loop schemes, on the other hand, no such decomposition exists at the transmitter, such that, when trying to perform the decomposition at the receiver wireless communication device (e.g., using a zero forcing equalizer to perform zero forcing equalization (ZFE)), then a severe noise enhancement may occur, if the optimal antenna spacing cannot be guaranteed.

Implementing these multiplications appropriately in the transmitter wireless communication device and receiver wireless communication device can demonstrate considerable gains when no optimal separation can be fulfilled.

Figure 10:
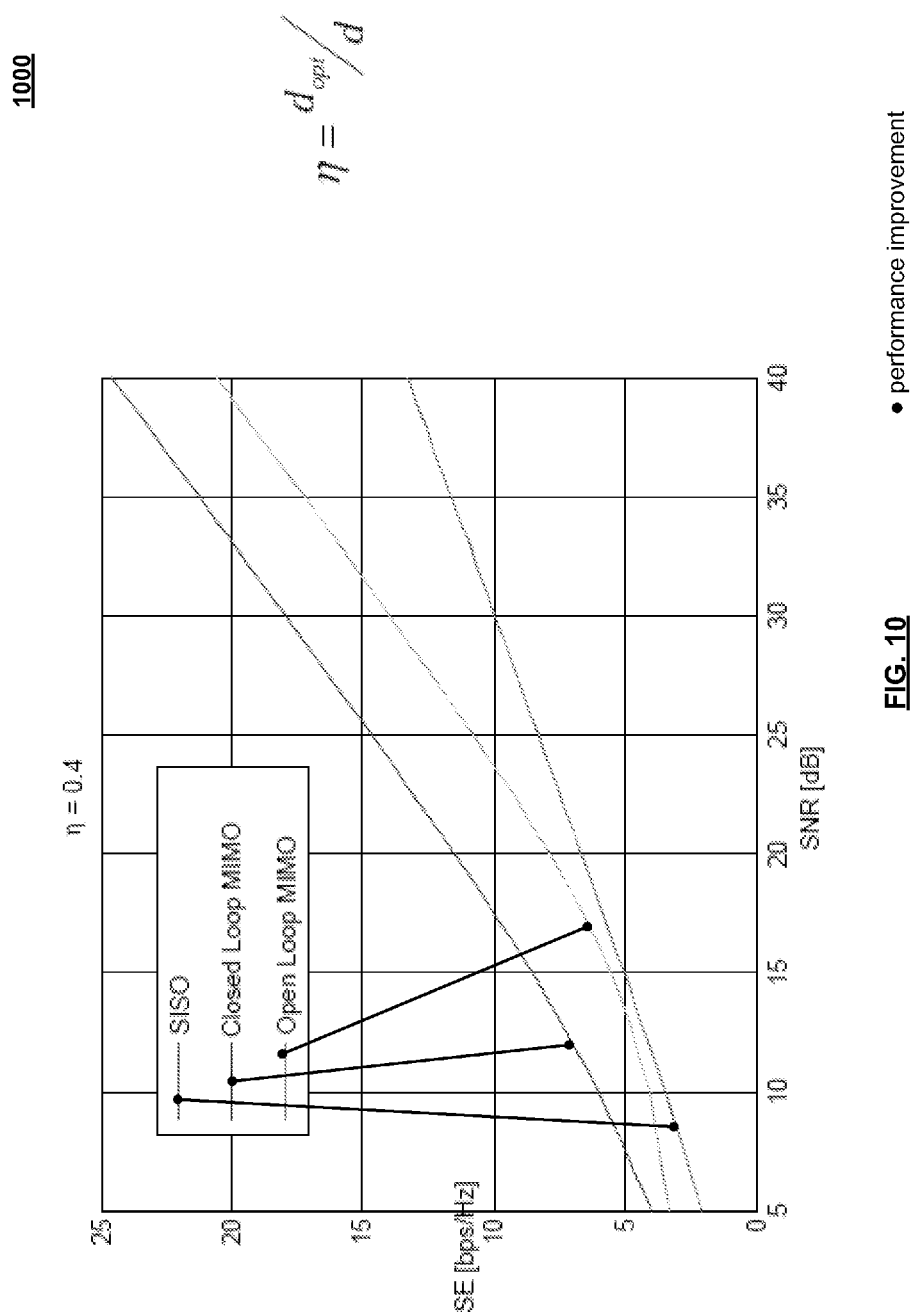
FIG. 10 illustrates an embodiment showing performance improvement as provided by geometric closed loop operation for line of sight (LOS) MIMO.

FIG. 10 illustrates an embodiment 1000 showing performance improvement as provided by geometric closed loop operation for line of sight (LOS) MIMO. In this diagram, it can be seen that for a given SNR (e.g. 20 dB) an addition of 3 bit/sec/Hz can be achieved, increasing system throughput by more than 30%. Another way of looking into the improvement, is by looking into the SNR required to achieve a certain value of bit/sec/Hz. In this diagram, it can be seen that for getting 10 bit/sec/Hz, there is a need for SNR of 24 dB without employing any one or more of the various aspects, embodiments, and/or their equivalents, of the invention and 17.5 dB SNR when employing any one or more of the various aspects, embodiments, and/or their equivalents, of the invention.

It is noted that various aspects, embodiments, and/or their equivalents, of the invention may be implemented in a number of ways. For example, considering at least two approaches for implementing this architecture, a first approach may be referred as Static Geometrical Closed Loop MIMO architecture. In this case, upon setting the transmitted and received antennae, measuring the geometrical setup and then calculating the optimal values for V and $U^H$ for use in the transmitter and receiver wireless communication devices.

The second approach may be referred to as Dynamic Geometrical Closed Loop MIMO architecture. In this case, the receiver wireless communication device will dynamically and continuously measure the channel matrix and then will update the transmitter with the optimal values to use (e.g., the optimal values of V to transmit the data with). Looking into such a LOS MIMO communication channel (e.g., a microwave channel), such a communication channel is mostly composed of a relatively few number of rays (e.g., 2-3 rays, such as at least one LOS channel and at least one non-LOS channel—such as characterized as a Rummler channel). Also, such a communication channel typically doesn't change very rapidly, and such variations can generally be easily tracked at the receiver wireless communication device, and a relatively low bandwidth feedback channel between the receiver and the transmitter wireless communication device may be employed to effectuate such feedback of information.

It is also noted that various aspects, embodiments, and/or their equivalents, of the invention can also be employed when dual polarizations are transmitted and received from each respective antenna.

Figure 11:
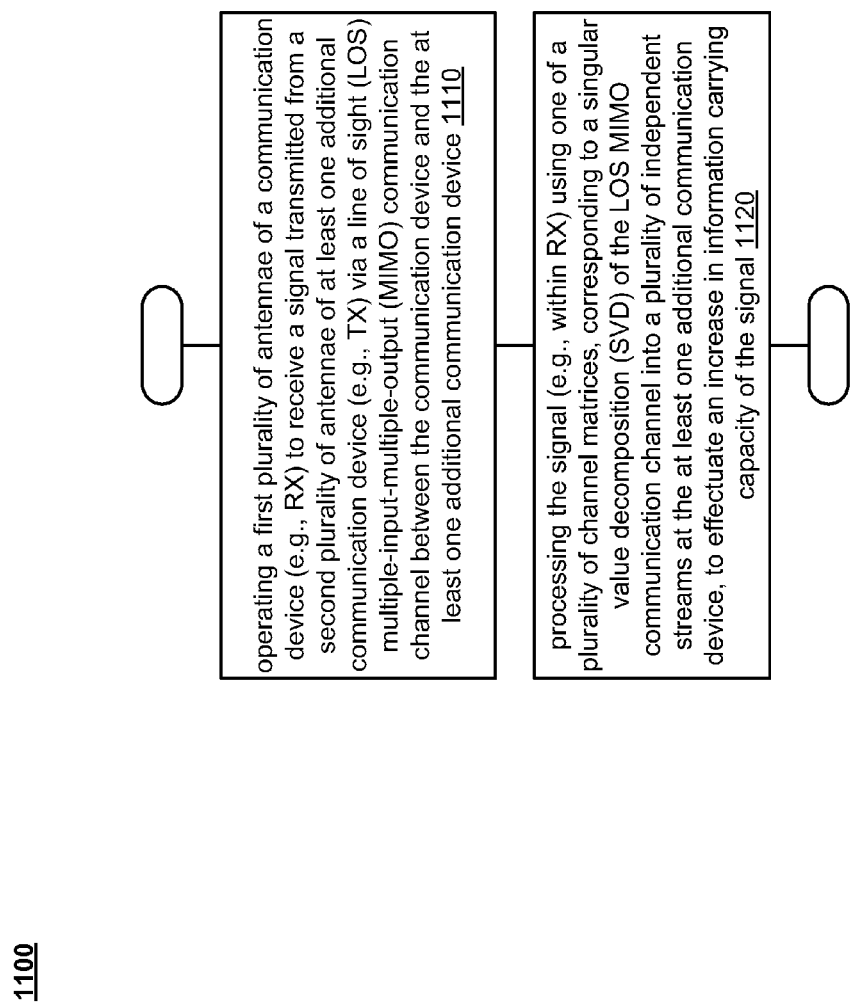
FIG. 11 and FIG. 12 illustrate various embodiments of methods for operating one or more communication devices.
Figure 12:
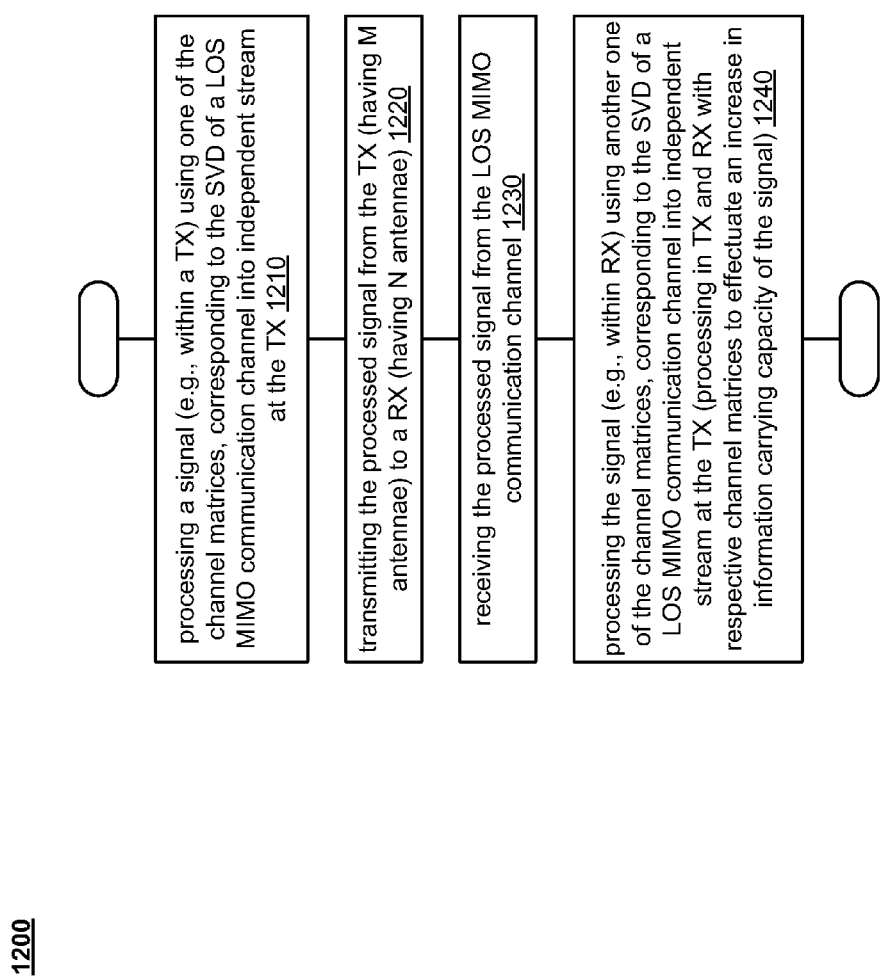

FIG. 11 and FIG. 12 illustrate various embodiments of methods 1100 and 1200, respectively, for operating one or more communication devices.

Referring to method 1100 of FIG. 11, the method 1100 begins by operating a first plurality of antennae of a communication device (e.g., receiver wireless communication device) to receive a signal transmitted from a second plurality of antennae of at least one additional communication device (e.g., transmitter wireless communication device) via a line of sight (LOS) multiple-input-multiple-output (MIMO) communication channel between the communication device and the at least one additional communication device, as shown in a block 1110.

The method 1100 then operates by processing the signal (e.g., within receiver wireless communication device) using one of a plurality of channel matrices, corresponding to a singular value decomposition (SVD) of the LOS MIMO communication channel into a plurality of independent streams at the at least one additional communication device, to effectuate an increase in information carrying capacity of the signal, as shown in a block 1120.

Referring to method 1200 of FIG. 12, the method 1200 begins by processing a signal (e.g., within a transmitter wireless communication device) using one of the channel matrices, corresponding to the SVD of a LOS MIMO communication channel into independent stream at the transmitter wireless communication device, as shown in a block 1210.

The method 1200 continues by transmitting the processed signal from the transmitter wireless communication device (having M antennae) to a receiver wireless communication device (having N antennae), as shown in a block 1220. The method 1200 then operates by receiving the processed signal from the LOS MIMO communication channel, as shown in a block 1230.

The method 1200 continues by processing the signal (e.g., within receiver wireless communication device) using another one of the channel matrices, corresponding to the SVD of a LOS MIMO communication channel into independent stream at the transmitter wireless communication device (processing in transmitter wireless communication device and receiver wireless communication device with respective channel matrices to effectuate an increase in information carrying capacity of the signal), as shown in a block 1240.

As may be interested, various communication systems may include wireless communications effectuated in accordance with at least one LOS MIMO communication channel. There may be instances in which the antenna spacing of such wireless communication devices may not be perfectly optimal to effectuate the maximum data throughput within the system. In such instances, operating in accordance with various aspects, embodiments, and/or their equivalents, of the invention can recover much, if not all, of the lost performance or degradation resulting from imperfectly spaced antennae.

Also, appropriate dealing with phase noise which may be existent within such multi-antenna devices can also recover much, if not all, of any lost performance. Such phase noises may be handled appropriately in any one of a number or combination of ways. For example, the respective antennae within a given communication device may all be driven from a common or singular local oscillator (LO). As may be understood, any phase noise generated in the respective antennae of the device, if driven by a common or singular local oscillator, will be common to all of those antennae, and the differential phase noise will be nonexistent or negligible. Alternatively, or in conjunction with the use of a common or singular local oscillator, a receiver device may perform channel estimation, among other channel monitoring activities, and provide such information to the transmitter so that the transmitter may compensate for any tracked phase noise (including differential phase noise) between respective antennae in a given device. It is also noted that such channel estimation operations may be performed cooperatively between a receiver device and the transmitter device.

By performing the appropriate calculation of the values associated with the channel matrices described herein, such as in accordance with performing SVD, of a LOS MIMO communication channel between at least two respective communication devices, and by performing the appropriate processing within the various communication devices using those values, the data throughput which may be achieved within the system can approach or converge to the Shannon limit channel capacity (e.g., in bits per second per Hz). Also, by appropriately addressing in overcoming phase noise between respective antennae that may occur within the transmitter and receiver communication devices, performance may be improved even further. Again, such phase noise may be addressed in one embodiment by continuously, or periodically, updating the respective channel matrices U and V based upon such phase noise. In another embodiment, a same or singular local oscillator may be employed to drive each of the respective antennae within a given device. Either of these particular means to address phase noise may be employed individually, or they may be employed cooperatively within a given embodiment.

It is also noted that the various operations and functions as described with respect to various methods herein may be performed within a variety of types of communication devices, such as using one or more processors, processing modules, etc. implemented therein, and/or other components therein including one of more baseband processing modules, one or more media access control (MAC) layers, one or more physical layers (PHYs), and/or other components, etc.

In some embodiments, such a processor, circuitry, and/or a processing module, etc. (which may be implemented in the same device or separate devices) can perform such processing to generate signals for communication with other communication devices in accordance with various aspects of the invention, and/or any other operations and functions as described herein, etc. or their respective equivalents. In some embodiments, such processing is performed cooperatively by a first processor, circuitry, and/or a processing module, etc. in a first device, and a second first processor, circuitry, and/or a processing module, etc. within a second device. In other embodiments, such processing is performed wholly by a processor, circuitry, and/or a processing module, etc. within a singular communication device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
  a first communication device that includes:
    a first plurality of antennae configured to transmit a signal; and
    a first processor configured to process the signal using a first of a plurality of channel matrices that correspond to a singular value decomposition (SVD) of a line of sight (LOS) multiple-input-multiple-output (MIMO) communication channel between the first communication device and a second communication device into a plurality of independent streams at the first communication device; and
  the second communication device includes:
    a second plurality of antennae configured to receive the signal transmitted from the first plurality of antennae of the first communication device via the LOS MIMO communication channel; and
    a second processor configured to process the signal using a second of the plurality of channel matrices, corresponding to the SVD, wherein the first of the plurality of channel matrices and the second of the plurality of channel matrices operate cooperatively to effectuate an increase in information carrying capacity of the signal via the LOS MIMO communication channel, and wherein the plurality of channel matrices that correspond to the SVD include the first of the plurality of channel matrices, a matrix having only entries on a diagonal thereof, and the second of the plurality of channel matrices.

2. The apparatus of claim 1, wherein the second processor is further configured to:
  the second processor configured to perform zero forcing equalization (ZFE) on the signal to effectuate the increase in information carrying capacity of the signal via the LOS MIMO communication channel.

3. The apparatus of claim 1 further comprising at least one of:
  the first processor configured to modify or update the first of the plurality of channel matrices based on first differential phase noise among the first plurality of antennae of the first communication device; or
  the second processor configured to modify or update the second of the plurality of channel matrices based on second differential phase noise among the second plurality of antennae of the second communication device.

4. The apparatus of claim 1 further comprising at least one of:
  the first communication device includes a first local oscillator (LO) to drive each of the first plurality of antennae to reduce or eliminate first differential phase noise among the first plurality of antennae; or
  the second communication device includes a second LO to drive each of the second plurality of antennae to reduce or eliminate second differential phase noise among the second plurality of antennae.

5. The apparatus of claim 1 further comprising:
  at least one of the first communication device or the second communication device configured to support communications within at least one of a satellite communication system, a wireless communication system, a wired communication system, a fiber-optic communication system, or a mobile communication system.

6. An apparatus comprising:
  a first plurality of antennae configured to receive a signal transmitted from a second plurality of antennae of at least one additional apparatus via a communication channel between the apparatus and the at least one additional apparatus; and
  a processor configured to:
    process the signal using one of a plurality of channel matrices that correspond to a singular value decomposition (SVD) of the communication channel into a plurality of independent streams at the at least one additional apparatus to effectuate an increase in information carrying capacity of the signal; and perform zero forcing equalization (ZFE) on the signal to effectuate the increase in information carrying capacity of the signal.

7. The apparatus of claim 6 further comprising:
a communication device configured to support communications within at least one of a satellite communication system, a wireless communication system, a wired communication system, a fiber-optic communication system, or a mobile communication system.

8. The apparatus of claim 6 further comprising:
the at least one additional apparatus including at least one additional processor configured to process the signal using another one of the plurality of channel matrices, corresponding to the SVD of the communication channel into the plurality of independent streams at the at least one additional apparatus, to effectuate the increase in information carrying capacity of the signal; and
the plurality of channel matrices, corresponding to the SVD, including the one of the plurality of channel matrices, a matrix having only entries on a diagonal thereof, and the another one of the plurality of channel matrices.

9. The apparatus of claim 8, wherein the at least one additional processor configured to:
modify or update the another one of the plurality of channel matrices based on differential phase noise among the second plurality of antennae of at least one additional apparatus.

10. The apparatus of claim 8, wherein the at least one additional processor further comprises:
a local oscillator (LO) to drive each of the second plurality of antennae to reduce or eliminate any differential phase noise among the second plurality of antennae.

11. The apparatus of claim 6 further comprising:
a local oscillator (LO) to drive each of the first plurality of antennae to reduce or eliminate any differential phase noise among the first plurality of antennae.

12. The apparatus of claim 6, wherein the processor is further configured to:
modify or update the one of the plurality of channel matrices based on differential phase noise among the first plurality of antennae.

13. The apparatus of claim 6, wherein the communication channel between the apparatus and at least one additional apparatus being a line of sight (LOS) multiple-input-multiple-output (MIMO) communication channel.

14. A method for execution by a communication device, the method comprising:
operating a first plurality of antennae of the communication device to receive a signal transmitted from a second plurality of antennae of at least one additional communication device via a line of sight (LOS) multiple-input-multiple-output (MIMO) communication channel between the communication device and the at least one additional communication device;
processing the signal using one of a plurality of channel matrices that correspond to a singular value decomposition (SVD) of the LOS MIMO communication channel into a plurality of independent streams at the at least one additional communication device to effectuate an increase in information carrying capacity of the signal; and
performing zero forcing equalization (ZFE) on the signal to effectuate the increase in information carrying capacity of the signal.

15. The method of claim 14, wherein the communication device is configured to support communications within at least one of a satellite communication system, a wireless communication system, a wired communication system, a fiber-optic communication system, or a mobile communication system.

16. The method of claim 14 further comprising:
operating at least one additional processor, of the at least one additional communication device, to process the signal using another one of the plurality of channel matrices, corresponding to the SVD of the LOS MIMO communication channel into the plurality of independent streams at the at least one additional communication device, to effectuate the increase in information carrying capacity of the signal; and wherein:
the plurality of channel matrices, corresponding to the SVD, including the one of the plurality of channel matrices, a matrix having only entries on a diagonal thereof, and the another one of the plurality of channel matrices.

17. The method of claim 16 further comprising:
within the at least one additional communication device, modifying or updating the another one of the plurality of channel matrices based on differential phase noise among the second plurality of antennae of at least one additional apparatus.

18. The method of claim 16 further comprising:
operating a local oscillator (LO), of the at least one additional communication device, to drive each of the second plurality of antennae to reduce or eliminate any differential phase noise among the second plurality of antennae.

19. The method of claim 14 further comprising:
operating a local oscillator (LO) of the communication device to drive each of the first plurality of antennae to reduce or eliminate any differential phase noise among the first plurality of antennae.

20. The method of claim 14 further comprising:
within the at least one additional communication device, modifying or updating the one of the plurality of channel matrices based on differential phase noise among the first plurality of antennae.

* * * * *